US012615223B2

(12) United States Patent
Shachar et al.

(10) Patent No.: US 12,615,223 B2
(45) Date of Patent: Apr. 28, 2026

(54) PROCESSING DATA PACKAGES FROM GEOGRAPHICALLY DISTRIBUTED SOURCES

(71) Applicant: Dell Products L.P., Round Rock, TX (US)

(72) Inventors: Tomer Shachar, Beer-Sheva (IL); Arieh Don, Newton, MA (US); Yevgeni Gehtman, Modi'in (IL)

(73) Assignee: Dell Products L.P., Round Rock, TX (US)

( * ) Notice: Subject to any disclaimer, the term of this patent is extended or adjusted under 35 U.S.C. 154(b) by 464 days.

(21) Appl. No.: 18/478,276

(22) Filed: Sep. 29, 2023

(65) Prior Publication Data

US 2025/0112877 A1 Apr. 3, 2025

(51) Int. Cl.
*H04L 49/9057* (2022.01)
*H04J 3/06* (2006.01)

(52) U.S. Cl.
CPC ........ *H04L 49/9057* (2013.01); *H04J 3/0661* (2013.01)

(58) Field of Classification Search
USPC .......................................................... 370/394
See application file for complete search history.

(56) References Cited

U.S. PATENT DOCUMENTS

2003/0235391 A1* 12/2003 Gates ........................ H04N 5/76
386/295
2010/0329141 A1* 12/2010 Apostol .................. H04L 49/90
370/252

2014/0114731 A1* 4/2014 Wright .................. H04J 3/0661
705/12
2014/0241163 A1* 8/2014 Lee .......................... H04L 47/27
370/235
2016/0337441 A1* 11/2016 Bloomquist ........... G06Q 10/06
2020/0314030 A1* 10/2020 Goel ....................... H04L 45/74
2021/0041890 A1* 2/2021 Lu ........................... G01S 19/14
2021/0075746 A1* 3/2021 Frankel .................. H04L 47/32
2022/0104281 A1* 3/2022 Xu ..................... H04W 74/0841
2022/0330347 A1* 10/2022 You .................. H04W 56/0045
2023/0403434 A1* 12/2023 Kondratovsky ... H04N 21/8456
2024/0069726 A1* 2/2024 Virani ................... G06F 3/0608
2024/0179653 A1* 5/2024 Wu ........................ H04W 56/00

OTHER PUBLICATIONS

LoRaWAN 1.1 Specification, 2017 LoRa Alliance, Inc. (Year: 2017).*
LoRaWAN Specification (Year: 2017).*

* cited by examiner

*Primary Examiner* — Chirag G Shah
*Assistant Examiner* — Majid Esmaeilian
(74) *Attorney, Agent, or Firm* — WOMBLE BOND DICKINSON (US) LLP

(57) ABSTRACT

Methods and systems for processing data from geographically distributed data sources are disclosed. The data may be processed by an application system that receives the data from geographically distributed data sources. Before arriving at the application system, the data may be affixed with a timestamp by a trusted local network component. The application system may reorder incoming data in a buffer based on the timestamp. Data may be then extracted from the buffer and processed based on the reordering.

20 Claims, 7 Drawing Sheets

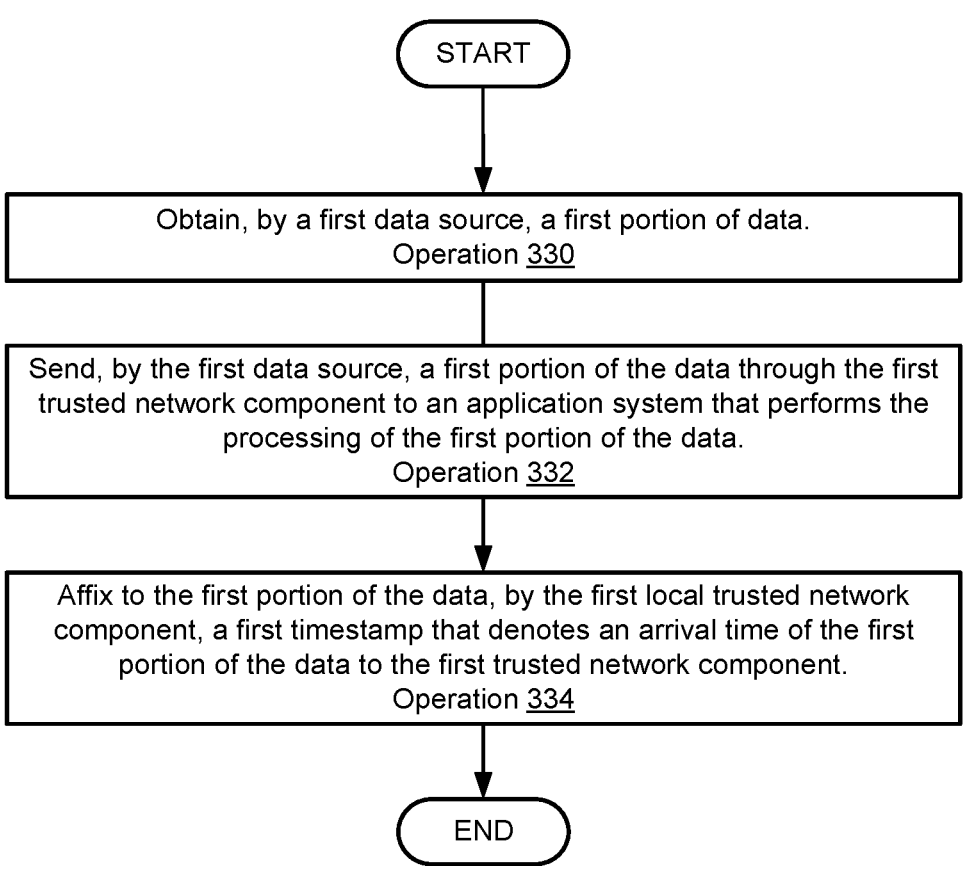

START

Obtain, by a first data source, a first portion of data.
Operation 330

Send, by the first data source, a first portion of the data through the first trusted network component to an application system that performs the processing of the first portion of the data.
Operation 332

Affix to the first portion of the data, by the first local trusted network component, a first timestamp that denotes an arrival time of the first portion of the data to the first trusted network component.
Operation 334

END

FIG. 3C

PROCESSING DATA PACKAGES FROM GEOGRAPHICALLY DISTRIBUTED SOURCES

FIELD

Embodiments disclosed herein relate generally to processing data packages. More particularly, embodiments disclosed herein relate to processing data packages from geographically distributed sources.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 3A-3C show flow diagrams illustrating methods in accordance with an embodiment.

DETAILED DESCRIPTION

Figure 1:
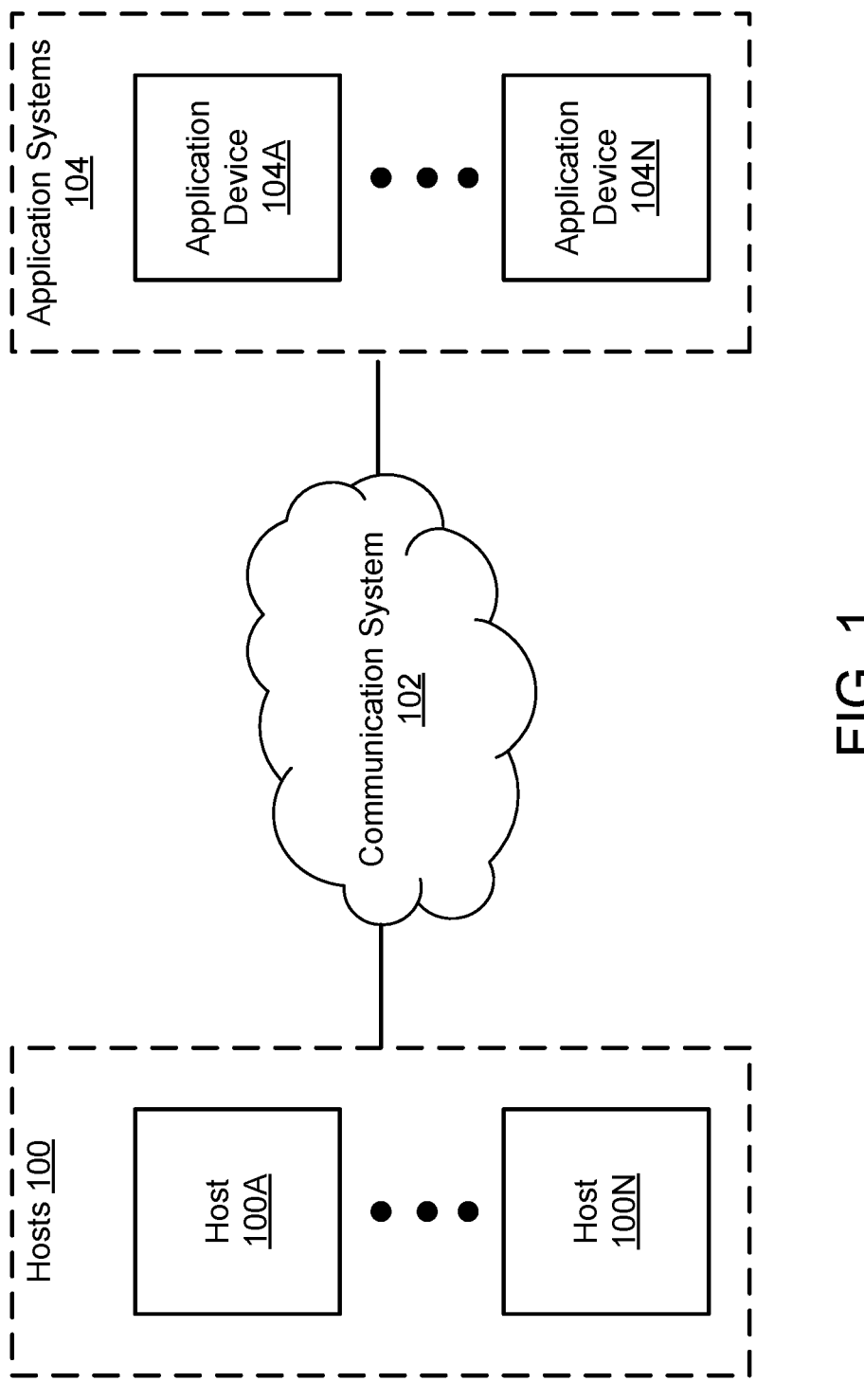
FIG. 1 shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for processing data packages in an application system. The data packages may be processed in an application system in chronological order based on timestamps. The timestamps may be affixed to the data packages shortly after generation of the data packages.

The data packages may be generated by one or more hosts. After generating the data package, the host may transmit the data package to the application system through a network communication system.

Through the communication system, a first trusted network component may receive the data package. On receiving the data package, the first trusted network component may affix a timestamp with at least the current date and time to the data package. After affixing the timestamp to the data package, the first trusted network may continue transmission of a timestamped data package through the network communication system to the application system.

The application system may receive the timestamped data package. The timestamped data package may be set into a buffer with other timestamped data packages. The buffer may regulate processing of the timestamped data packages based on a moving window that has a time window. The time window may have a start time and an end time. A set of timestamped data packages that have timestamps between the start time and end time may be gathered. The set of timestamped data packages may be reordered based on the timestamps. After reordering, the set of timestamped data packages may be processed in an order based on the reordering.

After the set of timestamped data packages may be processed, a new time window may be incremented. The new time window may be incremented by incrementing the start time and the end time. A new set of timestamped data packages, those with timestamps that fall within the new time window, may be gathered. The new set of timestamped data packages may be reordered, and then processed in an order based on the reordering.

In an embodiment, a method for processing data from geographically distributed data sources is provided. The method may include (i) obtaining, from a first data source of the geographically distributed data sources, a first portion of the data at a first point in time; (ii) obtaining, from a second data source of the geographically distributed data sources, a second portion of the data at a second point in time; (iii) adjusting a moving window with a time window based at least on a first geographic location of the first data source and a second geographic location of the second data source; and (iv) making a determination regarding whether the first point in time and the second point in time fall within the moving window. In a first instance of the determination where the first point in time and the second point in time fall within the time window: (a) establishing an ordering for the first portion of the data and the second portion of the data based on a first timestamp for the first portion of the data applied by a first trusted network component and a second timestamp for the second portion of the data applied by a second trusted network component; (b) placing the first portion of the data and the second portion of the data in a buffer with respect to each other based on the ordering; and (c) processing the first portion of the data or the second portion of the data first based on the ordering.

The method may further include, prior to obtaining the first portion of the data at the first point in time and prior to obtaining the second portion of the data at the second point in time: (i) obtaining, by the first data source, the first portion of the data; (ii) sending, by the first data source, the first portion of the data through the first trusted network component to an application system that performs the processing of the first portion of the data; and (iii) affixing to the first portion of the data, by the first local trusted network component, the first timestamp that denotes an arrival time of the first portion of the data to the first trusted network component.

Adjusting a moving window may include setting a duration of the moving window proportionally to a distance between the application system and one of the geographically distributed data sources that is furthest away from the application system.

Making a determination may include (i) identifying a starting point in time for the moving window; (ii) identifying an ending point in time for the moving window; (iii) identifying a time window that starts at the starting point in time and ends at the ending point in time; and (iv) determining whether the first point in time and the second point in time elapse within the time window of the moving window.

The first trusted network component has a clock that is trusted by the application system and is used in generating the timestamp The first data source is a user device that is untrusted by the application system and hosts an application through which the first portion of data is obtained.

The first portion of the data is transmitted over a first distance and the second portion of the data is transmitted over a second distance, the first distance resulting in a first delay and the second distance resulting in a second delay, the first delay and second delay being different when they are transmitted to and obtained by the application system.

The method may further include, in a second instance of the determination where the first point in time falls a first time window and the second point in time falls within a second time window: (i) establishing an ordering for the first portion of the data and the second portion of the data based on a first arrival time of the first portion of the data and a second arrival time of the second portion of data to an application system; (ii) placing the first portion of the data in a first buffer and the second portion of the data in a second buffer; (iii) processing the first portion of the data based on the first arrival time; and (iv) processing the second portion of data based on the second arrival time.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

The computer implemented services may be provided by processing data. The data may need to be processed in an order in which the data originated.

Due to a distributed nature of a system in which the data originates, it may not be possible to know at all points in time when different portions of data originates. For example, data may originate in different parts of the distributed system that are geographically separated. Consequently, there may be a time delay between when data originates and when the origination of the data is known throughout the distributed system.

If these different portions of data are processed when they become known, then the time delays may cause later originating portions of data to be processed ahead of earlier originating portions of the data.

For example, the data may be processed by applications systems 104 in the system of FIG. 1. Applications systems 104 may receive the data from hosts 100.

Geographic distances of hosts 100 from application systems 104 may vary. As the distances may vary, applications system 104 may receive the data from hosts 100 in an order that differs from the order in which the data was originated. The order in which data was received may be affected by latency, speed, and/or throughput.

As a result of the order in which the data was received, applications system 104 may not be able to process the data in the order in which the data was originated if it is processed in the order in which it is received.

If the data is processed in a different order from which it originated, various undesired outcomes may occur. For example, many types of processing may presume that data is processed in an order of origination. If the data is not processed in the order of origination, then downstream processes that use the processing results may be tainted, undesired decisions may be made, etc.

In general, embodiments disclosed here relate to systems and methods for processing data in an order in which it originates while balancing for timeliness of process. The data may be processed by at least partially reordering data for processing. The data may be reordered based on when the data originated so long as there isn't undue delay in transmitting the data to a processing location. The data may be reordered by rearranging the data from the order in which the data was received by applications system 104. The data may be rearranged based on a timestamp that is affixed to the data by a trusted entity (e.g., may not be the originator of the data). The timestamp may catalogue when the data was received by a trusted entity. The timestamp may be placed on the data, for example, by a first trusted network component (e.g., of communication system 102) through which the data travels to a processing location (e.g., any of application devices 104A-104N).

To manage undue delay in transmission of data to a processing location, a moving window may be employed in application systems 104. The moving window may establish a time window based on a starting point in time and an ending point in time. The starting point in time and the ending point in time may be established based on a set of geographic distances from hosts 100 to application systems 104. The geographic distances may increase latency, slow speed, and/or vary throughput of data. Therefore, the time window may be employed to account for delayed or missing data to applications system 104 that is deemed to be reasonable.

As data arrives to applications systems 104, the time window may be used to determine when to process portions of data and in which order. For example, when portions of data with timestamps arrive to applications system 104, the timestamps may be analyzed to see if the times from the timestamps fall within the time window. Any of the portions of data with timestamps that fall within the time window may be reordered based on the timestamps reflecting when the portions of data were first received by a trusted entity. The reordered portions of data may be processed based on the reordering. Portions of data that have timestamps that do not fall within the time window may be processed in an order defined by when the portions of data are received by application systems 104. As time progresses, the time window may move, with a moving starting point in time and a moving ending point in time. The timestamps of remaining portions of data and new portions of data that arrive to application systems 104 may be analyzed with the next iteration of the time window.

To provide the above noted functionality, the system may include hosts 100, and applications system 104. Each of these components is discussed below.

Hosts 100 may include any number of host 100A-100N. Host 100A-100N may provide computer implemented services cooperatively with other hosts and application systems 104. The cooperatively provided computer implemented systems may prefer that data is processed in an order in which it is originated. To cooperatively provide the computer implemented services, hosts 100 may (i) originate data, and (ii) send the originated data to application systems 104 via communication system 102 for processing.

Application systems 104 may cooperatively provide the computer implemented services with the hosts. To cooperatively provided the computer implemented services, application systems 104 may (i) receive portions of data from hosts 100 via communication system 102, (ii) maintain a moving window, (iii) honor timestamps from trusted entities that are applied to the portions of data and that fall within the moving window, (iv) disregarding timestamps from trusted entities that are applied to the portions of the data that fall outside of the moving window, (iv) reorder the portions of data with respect to other portions of data using the honored timestamps for processing purposes (for the portions of data for which timestamps are disregarded, the time at which each portion of data is received by the application device may be used for ordering purposes), and (v) and process the reordered data.

Figure 2A:
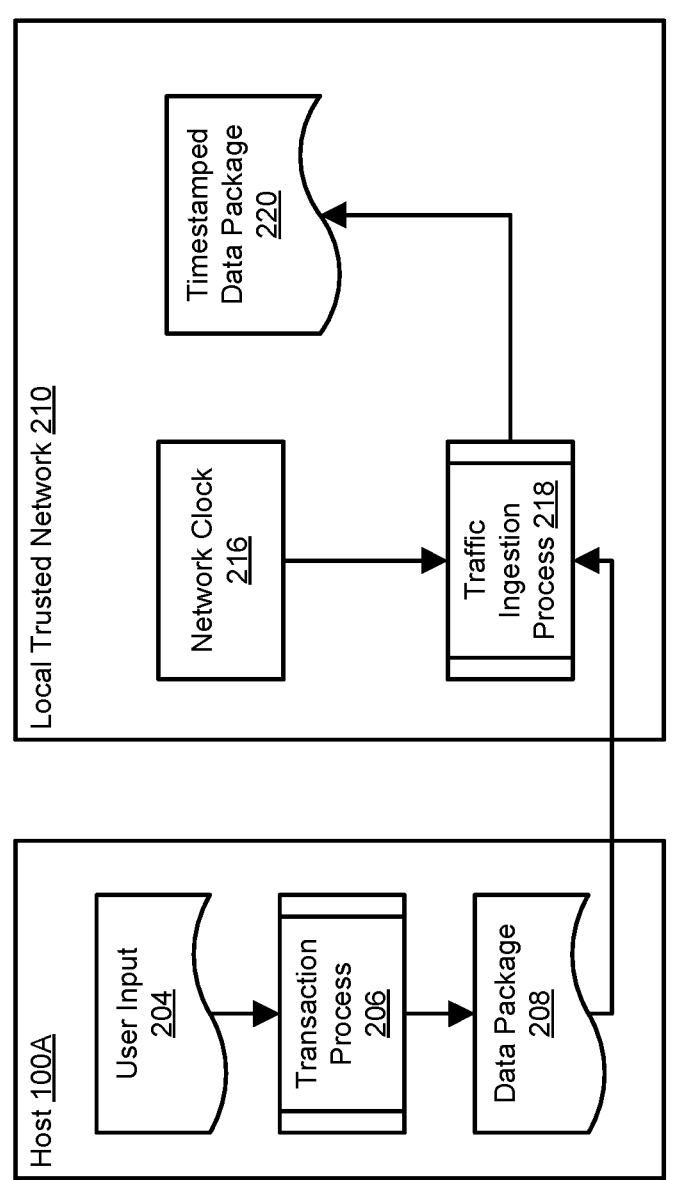
FIGS. 2A-2B show data flow diagrams in accordance with an embodiment.
Figure 2B:
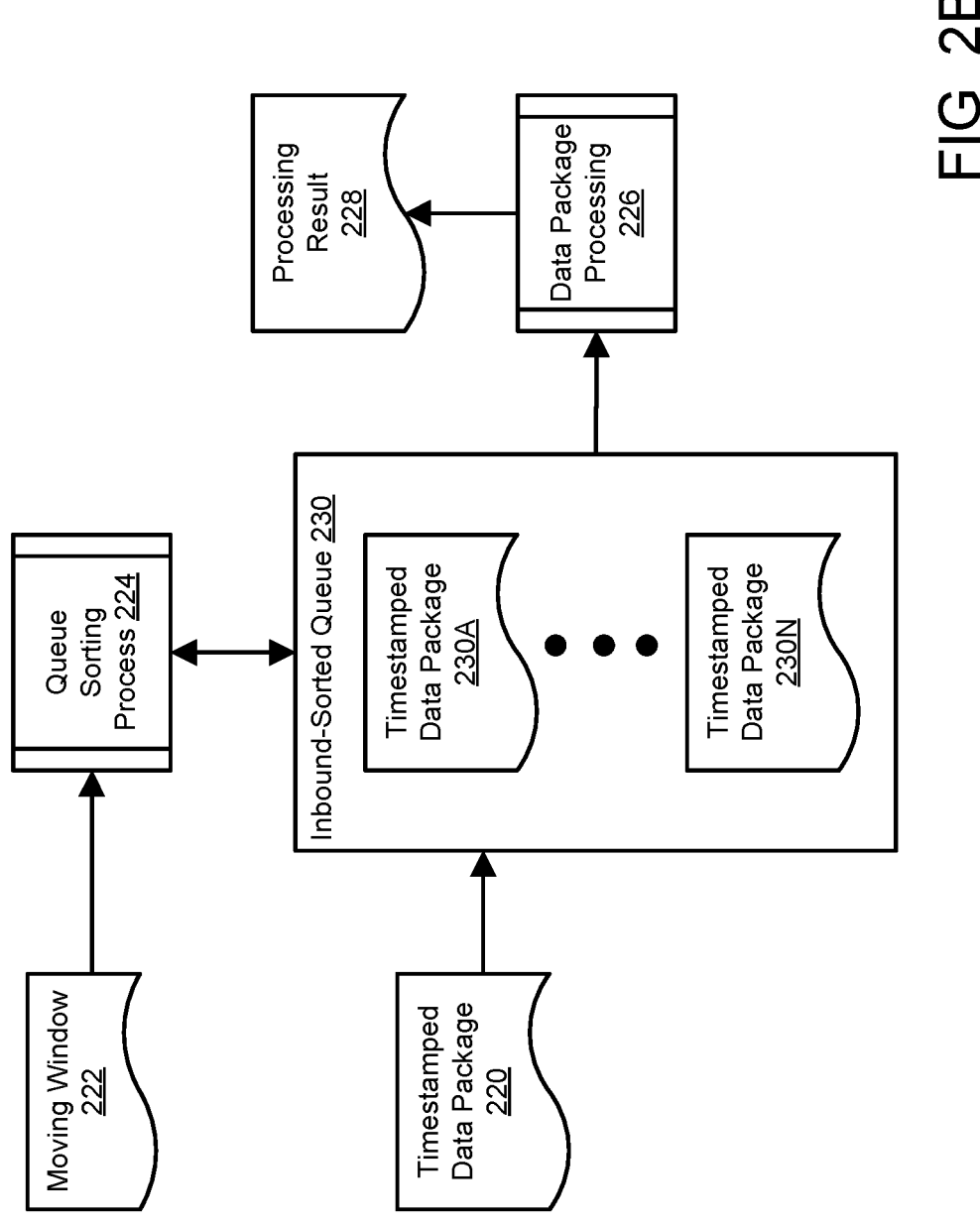

Application systems 104 may use trusted network components of communications system 102 to apply timestamps to portion of data that serve as a proxy for when the portions of data are originated. Time information applied by hosts 100 may not be honored because hosts 100 may not be trustworthy or at least may be more likely to be compromised or otherwise likely to misapply incorrect time data to portions of data. Refer to FIGS. 2A-2B for additional information regarding application and use of trusted timestamps for ordering purposes.

When providing their functionality, any of (and/or components thereof) hosts 100 and application systems 104 may perform all, or a portion, of the actions and methods illustrated in FIGS. 2A-3C.

Any of (and/or components thereof) hosts 100 and application systems 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

While illustrated in FIG. 1 as including a limited number of specific components, a system in accordance with an embodiment may include fewer, additional, and/or different components than those components illustrated therein.

Thus, as shown in FIG. 1, a system in accordance with an embodiment may reorder data for processing by application systems 104 using trusted timestamps affixed to data from hosts 100.

To further clarify embodiments disclosed herein, data flow diagrams in accordance with an embodiment are shown in FIGS. 2A-2B. In these diagrams, flows of data and processing of data are illustrated using different sets of shapes. A first set of shapes (e.g., 204, 208, etc.) is used to represent data structures and a second set of shapes (e.g., 206, 218, etc.) is used to represent processes performed using and/or that generate data.

Turning to FIG. 2A, a first data flow diagram in accordance with an embodiment is shown. The first data flow diagram may illustrate data used in and data processing performed in origination of data by a host and timestamping of data by a local trusted network.

To originate data, host 100A may perform a process that generates data. The process may be any type of process and which may be part of a computer implemented services provided by a distributed system of which host is a member 100A.

For example, transaction process 206 may be performed. During transaction process 206, data package 208 may be generated. Data package 208 may include any type and quantity of data to be processed in an order in which it is originated.

Transaction process 206 may ingest user input 204 and generate data package 208 based on user input 204. User input 204 may include any type and quantity of information and may be used by transaction process 206 to generate any type and quantity of data to be processed.

To process data package 208 in an order in which it is originated, data package 208 may need to be sent to a processing location. The process location may be any of application systems 104. The processing location may be tasked with processing data packages from any number of hosts in an order in which each data package is originated.

To send data package 208 to the processing location, data package 208 may be sent through local trusted network 210. Local trusted network 210 may be, for example, an internet service provider (ISP), a cellular phone tower, or a local area network. Local trusted network 210 may be a part of communication system 102.

Data package 208 may be received by local trusted network as incoming traffic. Upon receiving data package 208, local area network 210 may ingest data package 208 in traffic ingestion process 218. Traffic ingestion 218 may process all incoming network traffic, including data package 208.

Processing data package 208 in traffic ingestion 218 may include affixing a timestamp to data package 208. To affix the timestamp to data package 208, the current date and time (and/or other information), may be read from network clock 216 and affixed to data package 208 (e.g., may be added as part of the control information of a network data unit such as a packet used to transport data package 208 to the processing location). When affixing the timestamp, the time from network clock 216 may be adjusted to a particular time zone (or may otherwise be normalized) so that time stamps added to data packages by a variety of trusted entities may be directly compared to one another. For example, all timestamps affixed to data packages may be set for the Greenwich time zone. It will be appreciated that if the timestamps are not normalized to a particular time zone, then additional information (e.g., information regarding the time zone in which a trusted entity is located) may be added along with the timestamps so that the time stamps in conjunction with the additional information allow for an order of origination of the data packages to be identified. As a result of timestamping data package 208, traffic ingestion 218 may then generate timestamped data package 220.

Timestamped data package 220 may then be sent as outbound network traffic toward applications systems 104 represented in FIG. 1.

While the timestamps affixed to the data packages have been described with respect to components of local trusted network 210, it will be appreciated that the timestamps (and/or other time information) may be added by other entities. For example, a host that originated the data package may add the time information (e.g., if trusted).

Thus, using the data flow shown in FIG. 2A, embodiments disclosed herein may confirm generation of data by a host and timestamping of data by a local trusted network.

Turning to FIG. 2B, a second data flow diagram in accordance with an embodiment is shown. The second data flow diagram may illustrate data used in and data processing performed in processing of data in an order in which it is originated.

To process data in an order in which it is originated, timestamped data package 220 may be received by application systems 104. One of application device 104A-104N may receive timestamped data package 220.

Once received, timestamped data package 220 may be added to inbound-sorted queue 230. Inbound-sorted queue 230 may be a queue of data packages to be processed. The data packages may be ordered in the queue in an order in which the data packages will be processed.

Queue-sorting 224 may regulate the order of timestamped data packages (e.g., 230A-230N) in the queue. Queue sorting process 224 may regulate inbound-sorting queue 230 by a sorting procedure that utilizes moving window 222.

Moving window 222 may declare a start time and an end time, the difference of both giving a time window. Each of the data package 230A-230N in the queue may be ascribed a time by a trusted entity and a time when received by the application systems.

Queue sorting process 224 may use the time window to identify timestamped data packages that are eligible for reordering based on the time ascribed to them by the trusted entities (e.g., trusted network components). Any timestamped data packages that are ascribed a time by the trusted entity, or by host 100A if trusted, that falls within moving window 222 may be eligible for reordering. The eligible timestamped data packages may be reordered within the queue based on their times ascribed by the trusted entities. Thus, for ordering purposes, time when received by the application systems may be replaced by the time ascribed by the trusted entities (e.g., an earlier time). The timestamped data packages may then be ordered based on the earliest time which they are afforded.

For example, consider a scenario where a first timestamped data package is obtained by an application system at 1:00 PM but is stamped 12:48 PM and a second timestamped data package is obtained by an application system at 1:01 PM but is stamped 12:45 PM. So long as both are received within by the application within the time window, and written in a global-time standard, then both timestamped data packages would be eligible for reordering resulting in the second data package (e.g., given a time of 12:45) being ordered ahead of the first data package (e.g., given a time of 12:45) for processing purposes. However, if moving window 222 closes at 1:00 PM when the second time stamped data package is received, only the first data package would be eligible for reordering. Consequently, the first data package (e.g., given a time of 12:48) would be ordered ahead of the second data package (e.g., given a time of 1:01) for processing purposes.

The ordered timestamped data package 230A-230N may be sequentially processed by data package processing 226. Data package processing 226 may process all timestamped data packages in the order the time stamped data packages are in inbound-sorted queue 230. Processing result 228 may be generated by processing each data package in the order defined by inbound-sorted queue 230 as ordered by queue sorting process 224.

Moving window 222 may increment the start time and the end time by a discrete value of time and/or may be continuously incremented, and a new time window may be generated. As timestamped data package 230A-230N are added to inbound-sorted queue 230, queue sorting process 224 may continuously and/or discretely reorder them.

Overtime, the duration of moving window 222 may be updated as new hosts begin to originate data and/or existing hosts stop originating data. As discussed above, the duration of moving window 222 may be based on a longest distance between application systems 104 and the host that is the furthest away. Thus, changes in which hosts are participated in the cooperative computer implemented services may change this distance. The duration of moving window 222 may be set to take into account reasonable latency based on this distance. The reasonable latency may be set, for example, by a system administrator, via an automated process (e.g., sampling latency over time), and/or via other methods.

Thus, using the data flow shown in FIG. 2B, embodiments disclosed herein may facilitate processing of data package in an order in which they originate so long as no undue processing delays occur.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3A:
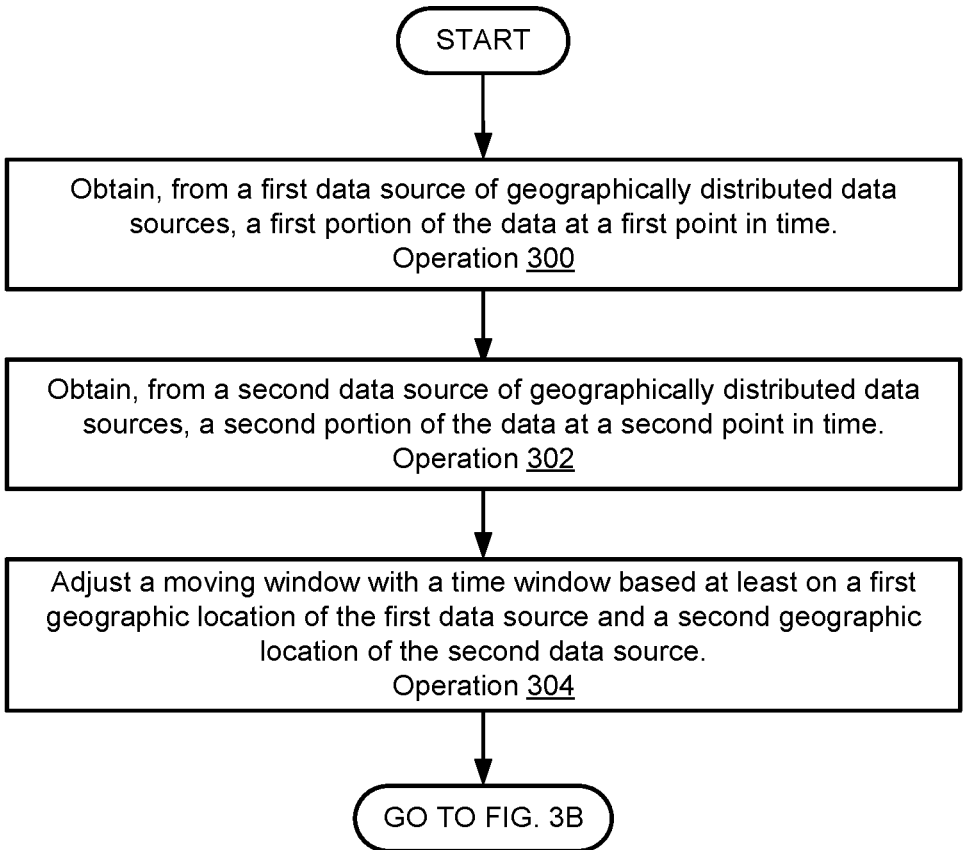
Figure 3B:
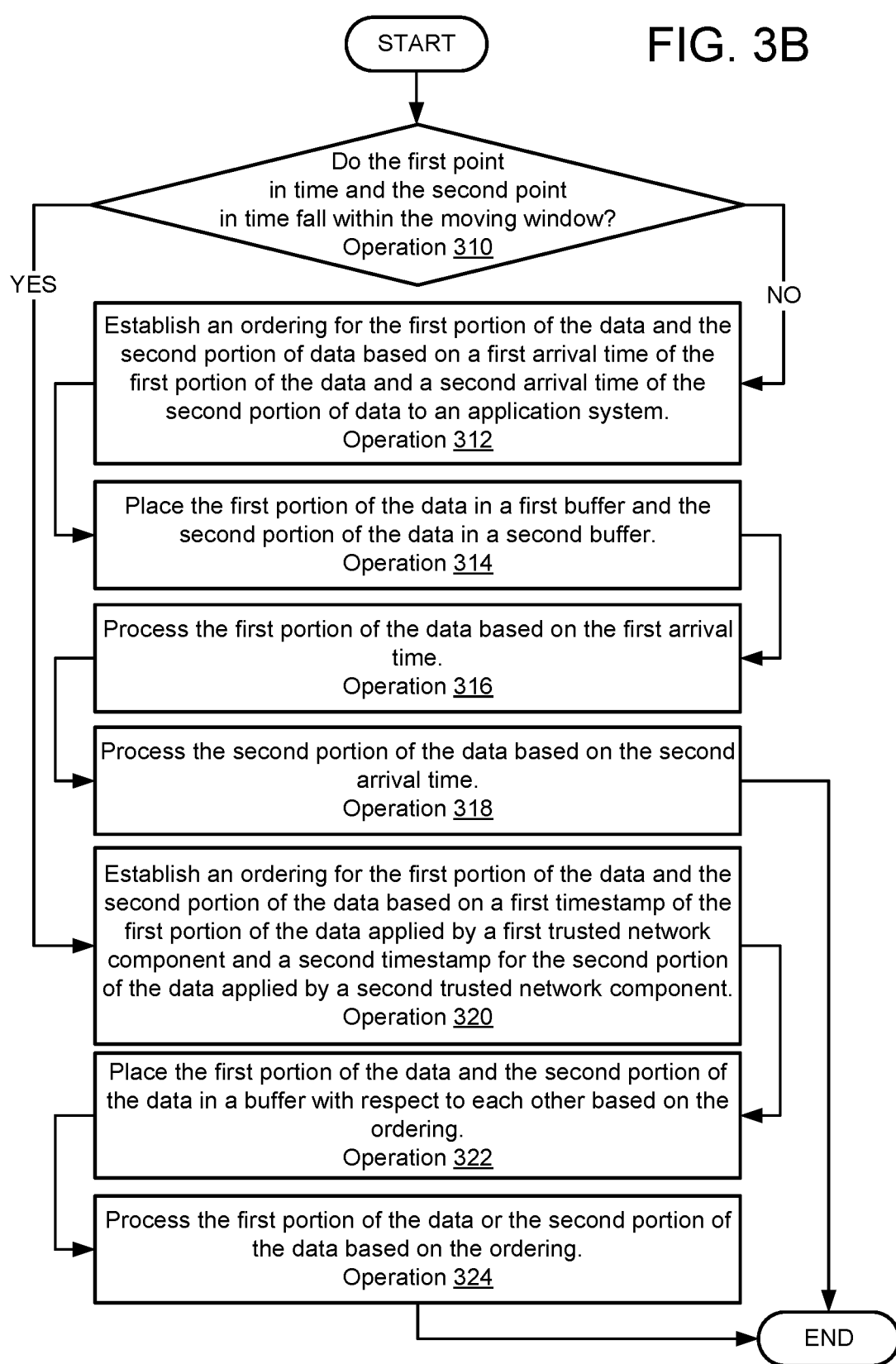

As discussed above, the components of FIG. 1 may perform various methods to process data as part of a cooperatively performed computer implemented services. FIGS. 3A-3C illustrate methods that may be performed by the components of the system of FIG. 1. In the diagrams discussed below and shown in FIGS. 3A-3C, any of the operations may be repeated, performed in different orders, and/or performed in parallel with or in a partially overlapping in time manner with other operations.

Turning to FIG. 3A, a first flow diagram illustrating a method of processing data from geographically distributed sources in accordance with an embodiment is shown. The method may be performed, for example, by any of the components of the system of FIG. 1, and/or other components not shown therein.

At operation 300, a first portion of data at a first point in time may be obtained from a first data source of geographically distributed data. The first portion of data may be obtained by receiving the first portion of data from the first data source of the geographically distributed data source. The first portion of data may be carried by a communication system. The first portion of data may be stamped with a timestamp that conforms to or is otherwise interpretable with a global time standard to enable any number of portions of data obtained from various data sources in different geographic regions to be temporally compared to one another.

At operation 302, a second portion of data at a first point in time may be obtained from a second data source of geographically distributed data. The second portion of data may be obtained by receiving the second portion of data from the second data source of the geographically distributed data source. The second portion of data may also be carried by the communication system. The second portion of data may also be stamped with a timestamp that conforms to or is otherwise interpretable with the global time standard thereby allowing for the two portions of data to be ordered with respect to time of origination.

At operation 304, a moving window with a time window based on at least a geographic location of the first data source and a second geographic location of the second source may be adjusted. The moving window may be adjusted by setting a duration of the moving window proportionally to a distance between the application system and one of the geographically distributed data sources that is furthest away from the application system. The duration of the moving window may be setting the time window based on a geographically distributed data source that is located furthest away from the application system.

Turning to FIG. 3B, FIG. 3B may show a continuation of the flow diagram shown in FIG. 3A.

At operation 310, a determination may need to be made if the first point in time and the second point in time fall within the moving window. The determination may be made by (a) identifying a starting point in time, (b) identifying an ending point in time, (c) identifying a time window that starts at the starting point in time and ends at the ending point in time, and (d) determining whether the first point in time and the second point in time are within the time window of the moving window.

The starting point in time may be identified by selecting a time near the current point in time. The ending point in time may be identified by selecting a time later than the starting point in time and based on the geographically distributed data source that is located furthest away from the application system. The time window that starts at the starting point in time and ends at the ending point in time may be identified by taking the time difference between the starting point in time and the ending point in time. Whether the first point in time and the second point in time may fall within the time window of the moving window may be determined by measuring if the first point in time and the second point in time are chronologically ahead of the start time of the time window of the moving window and chronologically behind the end time of the time window of the moving window.

If the first point in time and the second point in time fall within the moving window, then the method may continue to operation 320. If the first point in time and the second point in time do not fall within the moving window, then the method may continue at operation 312.

At operation 320, an ordering may be established for the first portion of the data and the second portion of the data based on a first timestamp of the first portion of the data applied by a first trusted network component and a second timestamp for the second portion of the data applied by a second trusted network component. The ordering may be established by arranging the first portion of the data and the second portion of the data in chronological order of the first timestamp and second timestamp.

At operation 322, the first portion of the data and the second portion of the data may be placed in a buffer (e.g., to establish a queue) with respect to each other based on the ordering. The first portion of the data and the second portion of the data may be placed in a buffer by cataloging the first portion of the data and the second portion of the data in the buffer based on the chronological order of the first timestamp and second timestamp.

At operation 324, the first portion of the data or the second portion of the data may be processed based on the ordering. The first portion of the data or the second portion of the data may be processed by processing the next portion of data in the buffer as ordered in the buffer. The method may end following operation 324.

Returning to operation 310, the method may proceed to operation 312 following operation 310 when the first point in time and the second point in time do not fall within the moving window.

At operation 312, an ordering for the first portion of the data and the second portion of data may be established based on a first arrival time of the first portion of the data and a second arrival time of the second portion of data to an application system. An ordering for the first portion of the data and the second portion of data may be established by arranging the first portion of the data and the second portion of the data in chronological order of the first arrival time and the second arrival time.

At operation 314, the first portion of the data may be placed in a first buffer and the second portion of the data may be placed in a second buffer. The first portion of the data may be placed in the first buffer and the second portion of the data may be placed in the second buffer by selecting the first portion of the data to be in the first buffer that scheduled for processing earlier than the second buffer, which holds the second portion of the data.

At operation 316, the first portion of the data may be processed based on the first arrival time. The first portion of the data may be processed by processing the next portion of data in the buffer based on the ordering of the buffer.

At operation 318, the second portion of the data may be processed based on the second arrival time. The second portion of the data may be processed by processing the next portion of data in the buffer based on the ordering of the buffer.

The method may end following operation 318.

As discussed with respect to FIGS. 3A-3B, portions of data may be ordered for processing based on trusted timestamps applied by trusted network entities so long as the portions of data are not unduly delayed. The timestamps may serve as a proxy for when the data is originated. Consequently, the processing order may be similar or identical to the origination order even in a distributed system.

Turning to FIG. 3C, a third flow diagram illustrating a method of providing originated data to a processing location in accordance with an embodiment is shown. The method may be performed, for example, by any of the components of the system of FIG. 1, and/or other components not shown therein.

At operation 330, a first portion of data may be obtained by a first data source. The first portion of the data may be obtained by originating, by the data source, the first portion of data.

At operation 332, the first portion of the data may be sent by the first data source through a first trusted network component to an application system that performs the processing of the first portion of the data.

At operation 334, a first timestamp may be affixed to the first portion of the data that denotes an arrival time of the first portion of the data to the first trusted network component. The first timestamp may be affixed by adding a date and time (and/or other information) to the first portion of data.

The method may end after operation 334.

Figure 4:
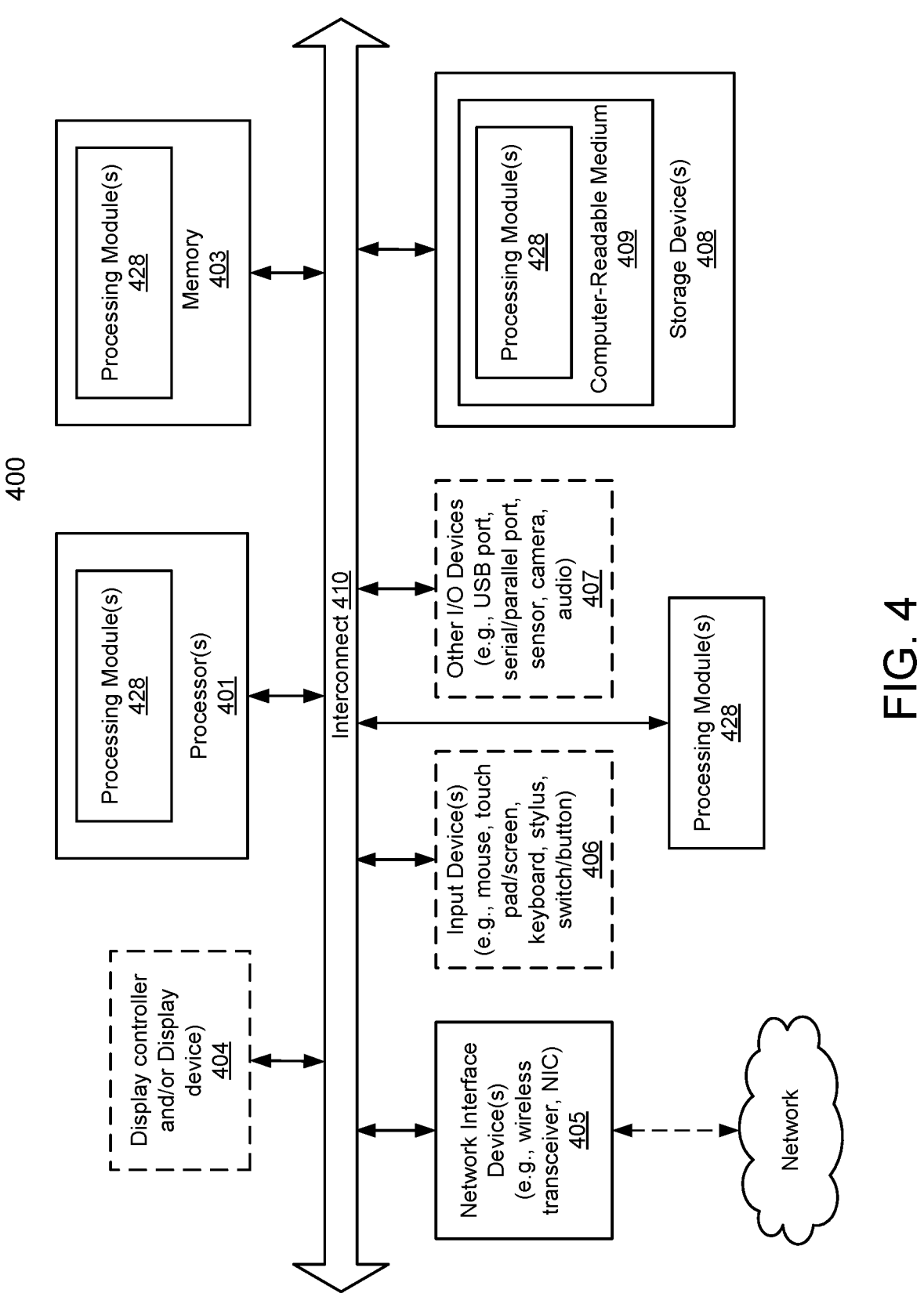
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for processing data from geographically distributed data sources, the method comprising:

obtaining, from a first data source of the geographically distributed data sources, a first portion of the data at a first point in time;

obtaining, from a second data source of the geographically distributed data sources, a second portion of the data at a second point in time;

adjusting a moving window with a time window based at least on a first geographic location of the first data source and a second geographic location of the second data source;

making a determination regarding whether the first point in time and the second point in time fall within the moving window;

in a first instance of the determination where the first point in time and the second point in time fall within the time window:

establishing an ordering for the first portion of the data and the second portion of the data based on a first timestamp for the first portion of the data applied by a first trusted network component and a second timestamp for the second portion of the data applied by a second trusted network component;

placing the first portion of the data and the second portion of the data in a buffer with respect to each other based on the ordering; and processing the first portion of the data or the second portion of the data first based on the ordering.

2. The method of claim 1, further comprising:

prior to obtaining the first portion of the data at the first point in time and prior to obtaining the second portion of the data at the second point in time:

obtaining, by the first data source, the first portion of the data;

sending, by the first data source, the first portion of the data through the first trusted network component to an application system that performs the processing of the first portion of the data; and affixing to the first portion of the data, by the first trusted network component, the first timestamp that denotes an arrival time of the first portion of the data to the first trusted network component.

3. The method of claim 2, wherein adjusting the moving window comprises:

setting a duration of the moving window proportionally to a distance between the application system and one of the geographically distributed data sources that is furthest away from the application system.

4. The method of claim 1, wherein making the determination comprises:

identifying a starting point in time for the moving window;

identifying an ending point in time for the moving window;

identifying a time window that starts at the starting point in time and ends at the ending point in time; and determining whether the first point in time and the second point in time elapse within the time window of the moving window.

5. The method of claim 2, wherein the first trusted network component has a clock that is trusted by the application system and is used in generating the timestamp.

6. The method of claim 2, wherein the first data source is a user device that is untrusted by the application system and hosts an application through which the first portion of data is obtained.

7. The method of claim 2, wherein the first portion of the data is transmitted over a first distance and the second portion of the data is transmitted over a second distance, the first distance resulting in a first delay and the second distance resulting in a second delay, the first delay and second delay being different when they are transmitted to and obtained by the application system.

8. The method of claim 1, further comprising:

in a second instance of the determination where the first point in time falls a first time window and the second point in time falls within a second time window:

establishing an ordering for the first portion of the data and the second portion of the data based on a first arrival time of the first portion of the data and a second arrival time of the second portion of data to an application system;

placing the first portion of the data in a first buffer and the second portion of the data in a second buffer;

processing the first portion of the data based on the first arrival time; and processing the second portion of data based on the second arrival time.

9. A non-transitory machine-readable medium having instructions stored therein, which when executed by a processor, cause the processor to perform operations for processing data from geographically distributed data sources, the operations comprising:

obtaining, from a first data source of the geographically distributed data sources, a first portion of the data at a first point in time;

obtaining, from a second data source of the geographically distributed data sources, a second portion of the data at a second point in time;

adjusting a moving window with a time window based at least on a first geographic location of the first data source and a second geographic location of the second data source;

making a determination regarding whether the first point in time and the second point in time fall within the moving window;

in a first instance of the determination where the first point in time and the second point in time fall within the time window:

establishing an ordering for the first portion of the data and the second portion of the data based on a first timestamp for the first portion of the data applied by a first trusted network component and a second timestamp for the second portion of the data applied by a second trusted network component;

placing the first portion of the data and the second portion of the data in a buffer with respect to each other based on the ordering; and processing the first portion of the data or the second portion of the data first based on the ordering.

10. The non-transitory machine-readable medium of claim 9, wherein the operstions further comprise:
prior to obtaining the first portion of the data at the first point in time and prior to obtaining the second portion of the data at the second point in time:
obtaining, by the first data source, the first portion of the data;
sending, by the first data source, the first portion of the data through the first trusted network component to an application system that performs the processing of the first portion of the data; and
affixing to the first portion of the data, by the first trusted network component, the first timestamp that denotes an arrival time of the first portion of the data to the first trusted network component.

11. The non-transitory machine-readable medium of claim 10, wherein adjusting the moving window comprises:
setting a duration of the moving window proportionally to a distance between the application system and one of the geographically distributed data sources that is furthest away from the application system.

12. The non-transitory machine-readable medium of claim 9, wherein making the determination comprises:
identifying a starting point in time for the moving window;
identifying an ending point in time for the moving window;
identifying a time window that starts at the starting point in time and ends at the ending point in time; and
determining whether the first point in time and the second point in time elapse within the time window of the moving window.

13. The non-transitory machine-readable medium of claim 10, wherein the first trusted network component has a clock that is trusted by the application system and is used in generating the timestamp.

14. The non-transitory machine-readable medium of claim 10, wherein the first data source is a user device that is untrusted by the application system and hosts an application through which the first portion of data is obtained.

15. A data processing system, comprising:
a processor; and
a memory coupled to the processor to store instructions, which when executed by the processor, cause the processor to perform operations for processing data from geographically distributed data sources, the operations comprising:
obtaining, from a first data source of the geographically distributed data sources, a first portion of the data at a first point in time;
obtaining, from a second data source of the geographically distributed data sources, a second portion of the data at a second point in time;
adjusting a moving window with a time window based at least on a first geographic location of the first data source and a second geographic location of the second data source;

making a determination regarding whether the first point in time and the second point in time fall within the moving window;
in a first instance of the determination where the first point in time and the second point in time fall within the time window:
establishing an ordering for the first portion of the data and the second portion of the data based on a first timestamp for the first portion of the data applied by a first trusted network component and a second timestamp for the second portion of the data applied by a second trusted network component;
placing the first portion of the data and the second portion of the data in a buffer with respect to each other based on the ordering; and
processing the first portion of the data or the second portion of the data first based on the ordering.

16. The data processing system of claim 15, wherein the operations further comprise:
prior to obtaining the first portion of the data at the first point in time and prior to obtaining the second portion of the data at the second point in time:
obtaining, by the first data source, the first portion of the data;
sending, by the first data source, the first portion of the data through the first trusted network component to an application system that performs the processing of the first portion of the data; and
affixing to the first portion of the data, by the first trusted network component, the first timestamp that denotes an arrival time of the first portion of the data to the first trusted network component.

17. The data processing system of claim 16, wherein adjusting the moving window comprises:
setting a duration of the moving window proportionally to a distance between the application system and one of the geographically distributed data sources that is furthest away from the application system.

18. The data processing system of claim 15, wherein making the determination comprises:
identifying a starting point in time for the moving window;
identifying an ending point in time for the moving window;
identifying a time window that starts at the starting point in time and ends at the ending point in time; and
determining whether the first point in time and the second point in time elapse within the time window of the moving window.

19. The data processing system of claim 16, wherein the first trusted network component has a clock that is trusted by the application system and is used in generating the timestamp.

20. The data processing system of claim 16, wherein the first data source is a user device that is untrusted by the application system and hosts an application through which the first portion of data is obtained.

* * * * *